Aug. 26, 1952     F. T. ECK     2,608,420
LOAD BRACING STRUCTURE FOR VEHICLES
Filed Jan. 3, 1949
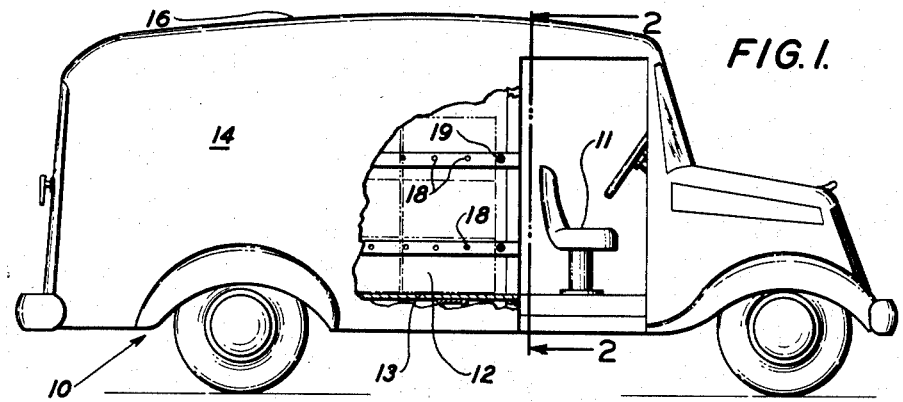
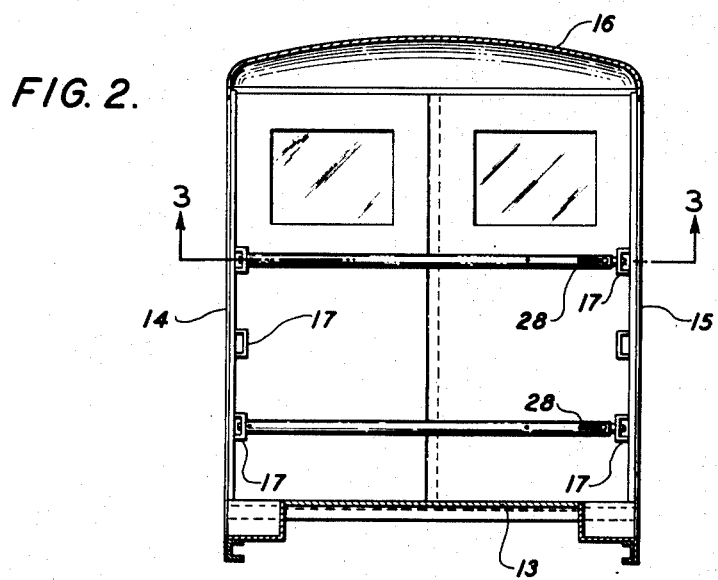
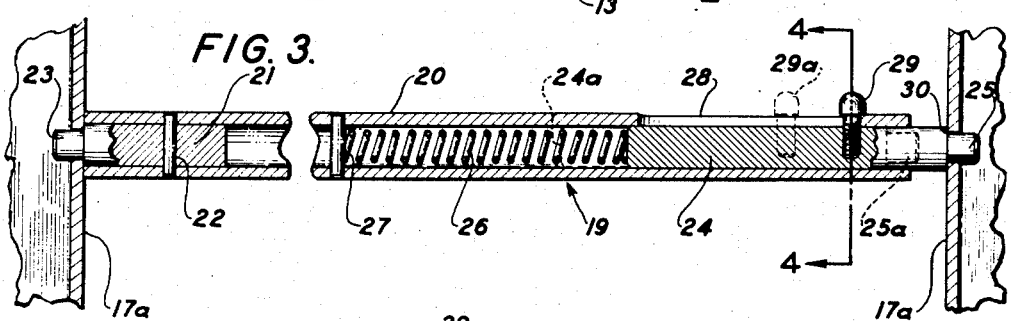
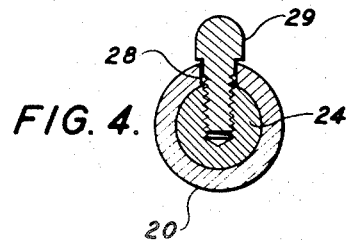
INVENTOR.
FRANK T. ECK
BY
D. Gordon Angus
ATTORNEY

Patented Aug. 26, 1952

2,608,420

UNITED STATES PATENT OFFICE 2,608,420

LOAD BRACING STRUCTURE FOR VEHICLES

Frank T. Eck, Glendale, Calif.

Application January 3, 1949, Serial No. 68,779

3 Claims. (Cl. 280—179)

This invention relates to safety devices for use in vehicles to prevent or minimize the shift of articles therein.

The principal object is to provide safety means in the form of cross bars or the like extending across the interiors of vehicles such as trucks, delivery vehicles and the like, to prevent the shifting of parcels or articles placed in the vehicle, during acceleration of deceleration, or changes of direction, thereby protecting the driver against injury.

Safety devices of this general character have heretofore been proposed but they have not been convenient for the driver to set in place readily at desired places in the truck, and with assurance of a high degree of safety.

In accordance with my present invention, I provide a safety arrangement of this character which is very easy to set or remove at any of a number of desired places, to suit the convenience of the driver. My invention is carried out by provision of a bar means in cooperation with mounting holes or slots at the sides of the vehicle. The bar is made extensible and provided with spring means so that it tends to assume its extended position. By this arrangement, the bar may readily be inserted in a hole or slot at one side of the vehicle, then compressed to a shorter length and then allowed to extend into a corresponding hole or slot on the other side.

A further feature of the invention resides in the provision of girders or supports oppositely located at the sides of the vehicle in which the slots or holes or the like are located at convenient intervals.

The foregoing and other features of my invention will be better understood from the following detailed description and accompanying drawings, of which:

Fig. 1 is a side elevation view of a motor vehicle shown with the side partially broken away to illustrate an application of the invention;

Fig. 2 is a cross-section view through the truck taken at line 2—2 of Fig. 1;

Fig. 3 is a cross-section view taken through one of the safety arrangements according to my invention, taken at line 3—3 of Fig. 2; and Fig. 4 is a detail view in cross-sectioin taken at line 4—4 of Fig. 3.

Referring to Fig. 1 there is shown a motor vehicle in the form of a well known type of delivery truck 10, provided with the usual driver's seat 11, to the rear of which is the usual large enclosed compartment 12 for holding the goods or merchandise or other products being transported. The compartment 12 is shown with the customary floor 13, sides 14 and 15, and a top 16.

For the purpose of supporting the safety bar, in accordance with my invention, I provide a number of channel members 17, preferably made from angle metal, which may have a U-shaped cross-section as shown. The members 17 will usually extend generally horizontally and ordinarily parallel with each other in the fore and aft direction along the sides of the vehicle. The channel members 17 are arranged in opposite pairs, one on each side of the vehicle. Each of the members 17 has a generally vertical face 17a spaced somewhat from the side wall and provided with a number of holes 18, the holes of the oppositely disposed pairs of channel members corresponding with each other, so as to present a number of pairs of opposite holes.

For providing the safety means in accordance with my invention, I use one or more safety bars 19 (Fig. 3). The safety bar comprises a hollow cylindrical tube 20, ordinarily of metal of a substantial strength, one end of which is provided with a plug or stopper 21, fitted within the end of the bar and held in place by a suitable lock pin 22, passing through the tube and the plug. The outer end of plug 31 has integral with it a concentric extension 23, which extends out beyond the end of tube 20.

The opposite end of tube 20 is provided with a member or plunger 24, which is preferably solid and is adapted to slide lengthwise within the hollow tube 20. The outer end of slidable member 24 has fitted to it a cylindrical extension 25 which can be in the form of a solid pin or plug forced concentrically within the end of member 24, so that it is held firmly in place. The inner end of member 24 abuts a helical compression spring 26, located within the tube 20, the opposite end of the spring being held against a dowel 27 fastened diametrically across tube 20. By this arrangement, the member 24 can be moved inwardly and outwardly with reference to tube 20, and the spring tends to push member 24 outwardly.

To control the extent of the longitudinal movement of plunger 24, the tube 20 is provided with a longitudinal slot 28 through its wall; and there is fastened into the slidable plunger 24, a set screw or knob 29 fitted so that its head and neck extend outwardly to protrude through the slot 28. Thus, the length of the slot limits the possible travel of the knob 29 which correspondingly limits the possible in and out movement of member 24. With the spring compressed, knob 29 will move to position 29a, and extension 25 will move to position 25a, these positions being shown by the dotted lines.

To set the safety bar in position, end 25 is pushed through the desired one of the holes or slots of the face 17a of one of channel members 17, so that the shoulder 30 at the end of the plunger abuts against the face 17a. Then by continuing to push toward the member 17 into which extension 25 is inserted, the member 24 will be pushed inwardly within its hollow tube 20, against the compression of the spring, sufficiently to allow the opposite extension 23 to be brought along the corresponding face 17a to the corresponding hole or slot 18 of the last-mentioned face 17a. Then by releasing the rod, the force of the spring 26 will push the member 23 into its hole or slot until the corresponding end of tube 20 abuts the face of the channel member, leaving the safety bar in the position shown in Figs. 2 and 3.

To remove the bar, the driver simply grasps it and pushes toward the end containing the plunger, thereby removing plug 23 from the hole.

As many of these safety bars as may be desired may be used in a single truck or vehicle. For example, it may be desired to have the bars at two or three different levels, as indicated in Figs. 1 and 2, depending upon how much merchandise or articles are placed within the vehicle. Furthermore, it may be desired to place bars at various intervals along the length of the truck, depending upon where the articles being transported are placed.

The construction of the bar is strong and due to the fastening arrangement, it cannot fall or shake out of place; and it will stop the forward sliding or movement of articles behind it.

It will be recognized that this affords the driver an exceptionally good safety arrangement and furthermore enables him easily and conveniently to position the safety bar at desired places within the vehicle, and also to change their position at will.

It should be understood that the invention is not limited to the particular details of construction herein shown and described, which are given by way of illustration rather than of limitation; and the invention is not limited except in accordance with the scope of the appended claims.

I claim:

1. In combination, a pair of oppositely located channel members extending lengthwise along the opposite sides of a vehicle, said channel members having faces opposed to each other, a plurality of pairs of holes through the respective faces, and a safety bar fitted into an opposite pair of said holes, said bar comprising a member extending from one channel member to another within the vehicle, an extension fastened at one end of the bar member and fitted into the corresponding hole, said extension being of smaller cross-section area than that of the bar member, and a slidable plunger within the opposite end of the bar member, said plunger having an extension protruding into the opposite hole and a compression spring located back of the plunger and tending to slide the plunger outwardly, whereby said extension members are maintained within the respective holes.

2. In combination, a pair of oppositely disposed horizontal strips with faces opposing each other, each strip having spaced holes, the holes of each strip being substantially opposite corresponding holes of the other strip and a safety bar adapted to be engaged in pairs of corresponding opposite holes of the two strips, said bar comprising a hollow tube, a cylindrical plug fastened within one end of the tube, said plug being a smaller cross-section area than the outer cross-section area of the tube and protruding from the tube, thereby providing a shoulder at the end of the tube which abuts the face of one of the strips when the protruding end of the plug is inserted into a hole of the last-mentioned strip, a plunger within the other end of the tube, an extension from the plunger of smaller cross-section area than that of the plunger itself and providing a shoulder at the end of the plunger which abuts the face of the other strip when the extension is inserted into a hole of the last-mentioned strip, and a spring in engagement with the plunger inside the tube which urges the plunger outwardly from the tube, whereby the plug and extension are adapted to be fitted and held into oppositely located holes.

3. In combination, a pair of oppositely disposed horizontal strips with faces opposing each other, each strip having spaced holes, the holes of each strip being substantially opposite corresponding holes of the other strip, and a safety bar fitted into a pair of opposite corresponding holes of the two strips, said bar comprising a member extending from side to side within the vehicle, an extension fastened at one end of the member of smaller cross-section area than the cross-section of the member, said member being hollow at least in that portion which terminates in the opposite end, a slidable plunger fitted within said opposite end, said plunger having an extension of smaller cross-section area than the area of the plunger itself and a spring engaged with the plunger for urging the plunger to slide outward from the member.

FRANK T. ECK.

REFERENCES CITED

The following references are of record in the file of this patent:

UNITED STATES PATENTS

| Number | Name | Date |
|---|---|---|
| 969,002 | Teachout | Aug. 30, 1910 |
| 1,548,053 | Mead | Aug. 4, 1925 |
| 1,665,439 | Brown | Apr. 10, 1928 |
| 1,742,457 | Wittman | Jan. 7, 1930 |
| 1,838,472 | Barrett | Dec. 29, 1931 |
| 2,051,420 | Renholdt | Aug. 18, 1936 |
| 2,122,950 | Reifer | July 5, 1938 |
| 2,194,922 | Walsh | Mar. 26, 1940 |
| 2,425,875 | Hermann | Aug. 19, 1947 |

FOREIGN PATENTS

| Number | Country | Date |
|---|---|---|
| 242,551 | Great Britain | Nov. 12, 1925 |